Patented Mar. 5, 1935

1,993,221

UNITED STATES PATENT OFFICE 1,993,221

RECTIFYING SYSTEM

Heinrich Meyer-Delius, Heidelberg-Schlierbach, Germany, and Erwin Kern, Ennetbaden, Switzerland, assignors to Aktiengesellschaft Brown Boveri & Cie., Baden, Switzerland, a jointstock company of Switzerland Application August 10, 1932, Serial No. 628,266
In Germany August 10, 1931

15 Claims. (Cl. 175—363)

This invention relates to improvements in the connections of electric current rectifiers including, in particular, rectifiers of the gaseous or of the metallic vapor arcing type, and more particularly to means for supplying such rectifiers with currents of a number of phases greater than the number of phases of the supply line.

Rectifiers of the gaseous or of the metallic vapor arcing type are usually supplied from a three-phase alternating current supply line to which they are connected by means of suitable transformers. To obtain satisfactory voltage regulation and to reduce the voltage ripple of the direct current output circuit, the number of phases of the transformer secondary winding is usually increased from three to six by the connection of the middle of the several secondary windings to a common neutral point. The number of transformer secondary phases is also frequently increased to a number greater than six by the use of additional secondary windings, in which case the number of phases is selected as a multiple of six to retain the symmetry of connections and also to obtain a uniform loading of the several transformer phases and of the rectifier anodes connected therewith. The secondary winding of the transformer may then be considered as being constituted of a number of symmetrical six-phase systems displaced with respect to each other by a certain electrical angle. This angle will be 30° if only two six-phase systems are provided, 20° for three six-phase systems, etc. Generally, a transformer connected with a supply line having P phases will have a 2NP phase secondary constituted of N systems of 2P phases, the systems being displaced with respect to each other by 360/2NP electrical degrees. If the primary supply voltage wave is not a pure sine wave, but is distorted by the presence of harmonic voltages, the voltages in the several secondary phases of the transformer will no longer be exactly equal in magnitude. Such differences in magnitude are due to the fact that, in the different secondary windings, the harmonic voltages are neither equal nor in the same phase relation with respect to the associated fundamental voltage wave, for the reason that each winding displaces the fundamental wave and all its harmonics by the same electrical angle which is a different fraction of a cycle or cycles for the fundamental and for each of the individual harmonics. In addition, the inductances of the different secondary windings are not identical because some of the windings are linked with one primary winding only and some with two or more primary windings. For the above two reasons, the secondary terminal voltages of the transformer are unequal with the result that the several secondary phases of the transformer and the rectifier anodes connected therewith carry different amounts of current. With the connections above described the transformer and the rectifier are not efficiently employed because only one phase is utilized at each instant out of 12 or 2NP phases. Both the above disadvantages are overcome when the individual anode circuits are magnetically interlinked thereby causing a simultaneous operation of two or more transformer phases and the anodes connected therewith.

One of the objects of the present invention is, therefore, to provide a rectifying system in which the different anode circuits are interlinked magnetically.

Another object of the invention is to provide a rectifying system in which the different anode circuits are interlinked by means of a single magnetic structure.

Another object of the invention is to provide a rectifying system in which the different anode circuits are interlinked for obtaining simultaneous operation of two or more transformer phases and the rectifier anodes connected therewith.

Another object of the invention is to provide a rectifying system in which the different anode circuits are interlinked for the purpose of obtaining a uniform current distribution between the several anodes of the rectifier.

Another object of the invention is to provide a rectifying system in which the different anode circuits are interlinked for the purpose of neutralizing the effect of the harmonics in the primary supply voltage wave.

Another object of the invention is to provide a rectifying system in which the different anode circuits are interlinked for the purpose of neutralizing the effect of differences in the inductances of the several transformer secondary windings.

Other objects and advantages of this invention will be apparent from a reading of the specification and of the drawings forming a part thereof, in which like reference numerals are used to designate the same elements throughout the various views.

Figure 1 diagramatically illustrates one embodiment of the invention in which a 12-phase rectifying system employing an electric current rectifier of the metallic vapor arcing type in which the anode circuits are interlinked by means of two polyphase balancing transformers which are located between the anodes and the supply transformer secondary windings and are conductively interconnected.

Figure 1:
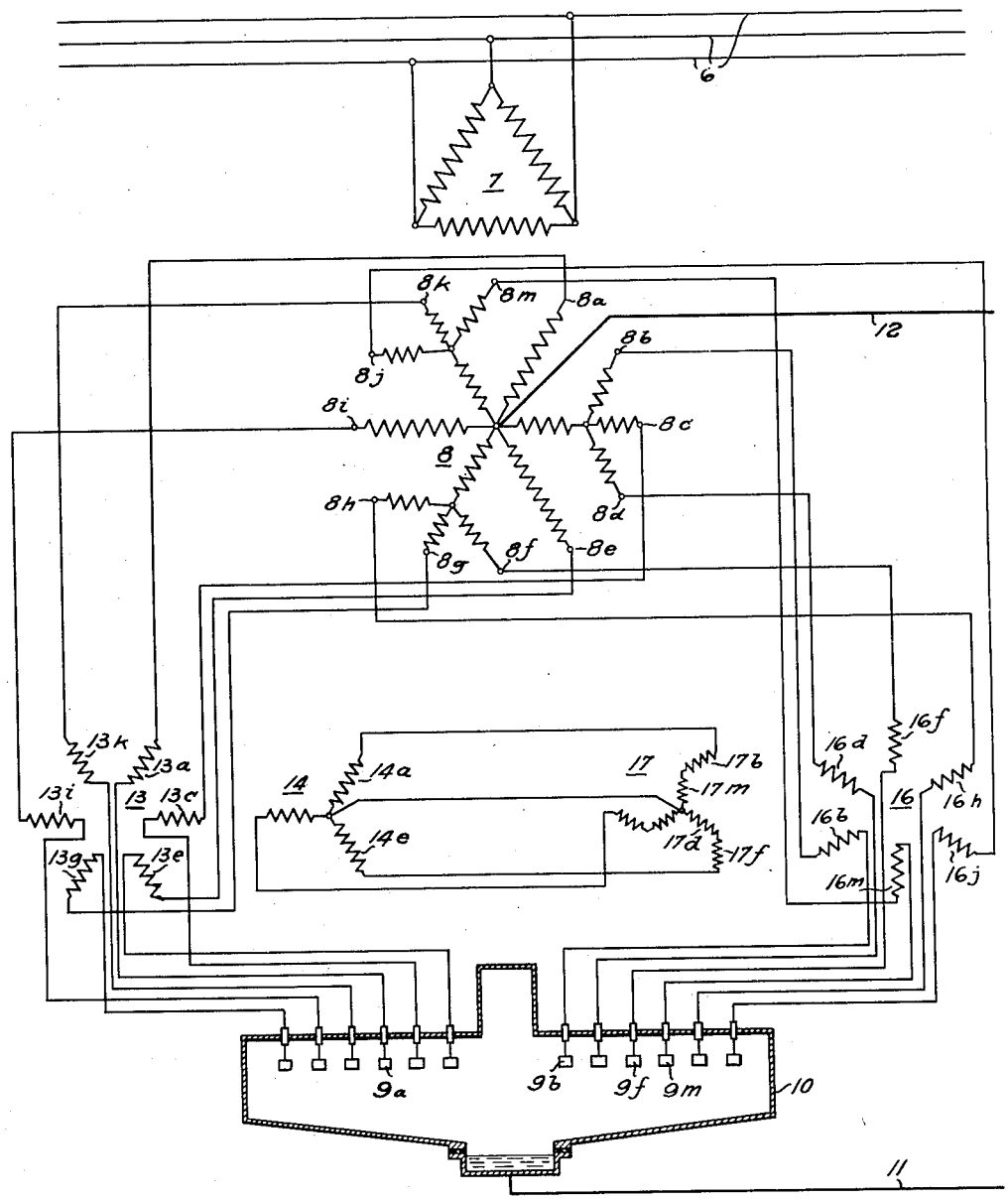

Referring more specifically to the drawings by characters of reference, reference numeral 6 designates a polyphase alternating current supply line represented as a three-phase line as being most frequently utilized in practice. The rectifying system includes a transformer having a primary winding 7 herein illustrated as being connected in delta and receiving current from line 6. The transformer secondary winding, generally represented as at 8, comprises a plurality of windings 8a, 8b, 8c, 8d, 8e, 8f, 8g, 8h, 8i, 8j, 8k, 8m, connected at a neutral point with one of the conductors 12 of the direct current output circuit and severally connected with the anodes 9 of a rectifier 10 having a cathode preferably of vaporizable material such as mercury connected with the other conductor 11 of a direct current output circuit. Windings 8a, 8c, 8e, 8g, 8i, 8k are connected with the anodes of the rectifier through similarly lettered windings of a polyphase balancing transformer having a primary winding 13 and a secondary winding 14. Windings 8b, 8d, 8f, 8h, 8j, 8m are similarly connected with a balancing transformer having a primary winding 16 and a secondary winding 17. Windings 14 and 17 are conductively connected and are respectively connected in star and in zigzag to permit such conductive connection even though the respective portions thereof receive currents displaced in phase relative to each other.

In operation, assuming that winding 7 is energized from line 6, winding 8 will receive 12-phase alternating current voltages of which the voltage in winding 8a may be assumed as being the highest at the moment of operation considered. A current will then flow from winding 8a to winding 13a, anode 9a and in output circuit lines 11 and 12. Flow of current in winding 13a will induce a current in winding 14a which current will also circulate in windings 17b, and 17m. The flow of such currents will tend to magnetize the cores of transformers 13, 14, and 16, 17 in such a manner as to oppose the potential of winding 8a and will add to the voltages of windings 8m and 8b to the end that the voltages impressed between the anodes 9a, 9m and 9b and the output conductor 12 may become equal, thereby forcing simultaneous operation of anodes 9a, 9m and 9b. At a later moment of operation the voltage of winding 8b will have become the highest of the secondary voltages and a current will flow in winding 8b, winding 16b, anode 9b, and in conductors 11 and 12. A current will be induced in winding 17d which will also circulate in windings 17f and 14e. By a process similar to that explained above the voltages between anodes 9d, 9f and 9e, and line 12 become equal and the three anodes enumerated operate simultaneously. The above process is repeated in a similar fashion for each phase as the successive phases of the winding 8 reach highest potential. At each instant the difference between the voltages impressed by the several phases of winding 8 on the several anodes operating simultaneously appears in equal amounts across the terminals of the corresponding windings 13 and 16 with the result that the voltage in output circuit 11, 12 is the average of the voltages impressed by the several phases of winding 8 on the several anodes operating simultaneously. It will be understood from the above that, because several anodes are always in simultaneous operation, the length of time during which each anode is utilized is appreciably greater than $\frac{1}{12}$ of a cycle so that the utilization of the rectifier and the transformer is improved. In addition to such improved utilization, the voltage of the output circuit being the average of the voltages of several anodes associated with both the six-phase portions of winding 8, the voltage remains constant and any differences in the anode voltages, due to differences in transformer reactances or due to harmonics in the supply line voltage wave, will not appear in the output circuit and will appear in the several portions of windings 13 and 16. The several anodes of rectifier 9 thus receive equal operating voltages and must therefore carry equal amounts of current.

Figure 2:
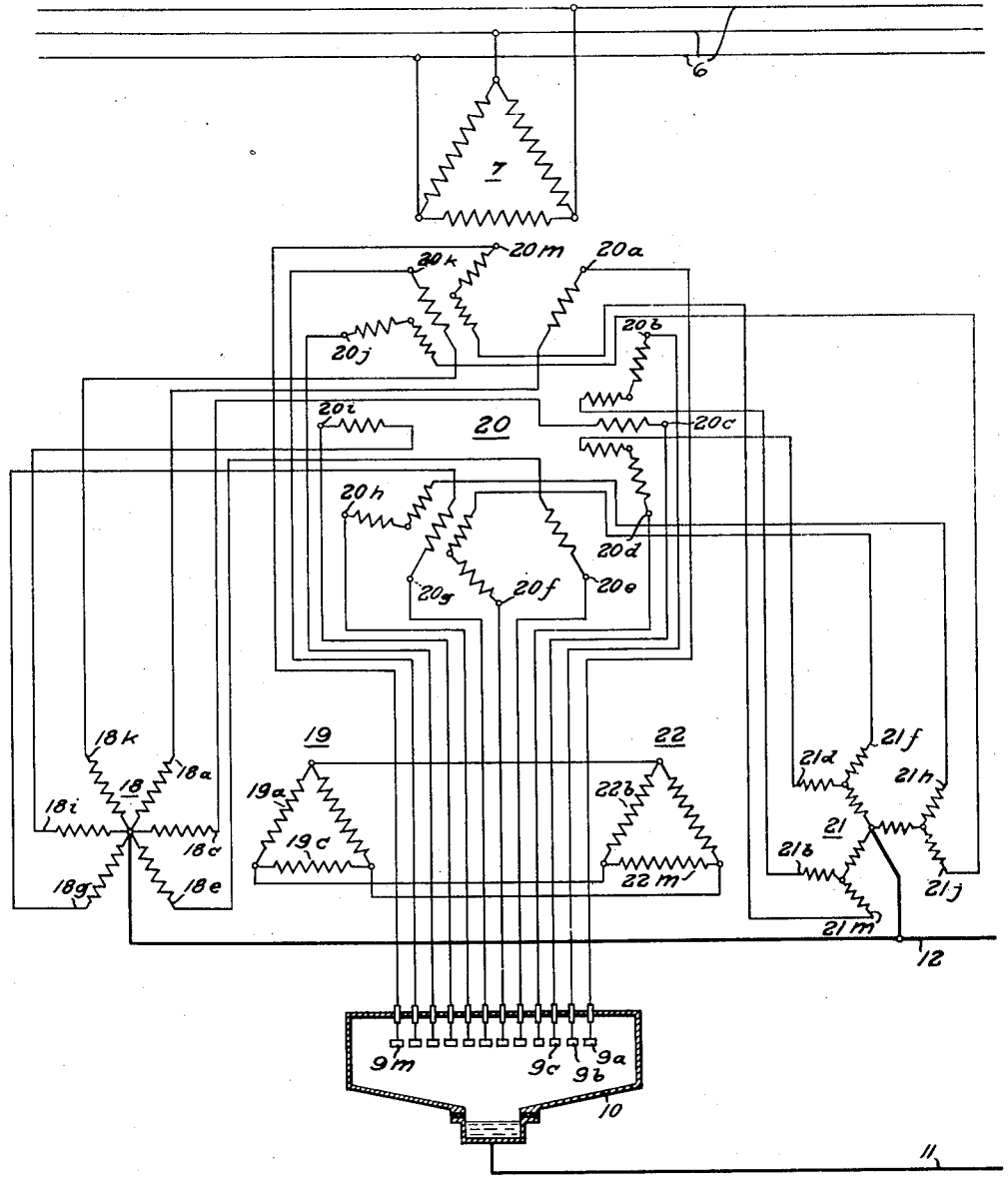
Fig. 2 illustrates a 12-phase rectifying system in which the anode circuits are interlinked by two polyphase balancing transformers which are located between the supply transformer secondary windings and the output circuit and are conductively interconnected.

In the embodiment shown in Fig. 2, the supply transformer secondary winding, generally designated by 20, comprises a plurality of windings 20a, 20b, 20c, 20d, 20e, 20f, 20g, 20h, 20i, 20j, 20k, and 20m, severally connected with the anodes 9 of rectifier 10. Windings 20a, 20c, 20e, 20g, 20i, 20k, are connected with the output circuit conductor 12 through similarly lettered windings of a polyphase balancing transformer having a primary winding 18 and a secondary winding 19. Windings 20b, 20d, 20f, 20h, 20j, 20m, are similarly connected with a balancing transformer having a primary winding 21 and a secondary winding 22. Windings 19 and 22 are conductively connected and are both wound in delta connection. Because the currents impressed on windings 18 are displaced in phase relative to the currents impressed on windings 21, winding 18 is connected in star and winding 21 is connected in zigzag so as to permit induction of currents in phase in windings 19 and 22.

In operation, assuming that winding 7 is energized from line 6, winding 20 will receive twelve phase alternating current voltages of which the voltage in winding 20a may be assumed as being the highest at the instant of operation now to be considered. A current will then flow from winding 20a to anode 9a, in output circuit lines 11 and 12 and in winding 18a. Flow of current in winding 18a will induce a current in winding 19a which current will also circulate in winding 22b. The flow of these currents will tend to magnetize the cores of transformers 18, 19 and 21, 22 in such a manner as to oppose the potential of winding 20a and to add to the potentials of windings 20m and 20b to the end that the voltages impressed between the anodes 9a and 9m and 9b and the output conductor 12 may become equal thereby forcing simultaneous operation of anodes 9a, 9m, 9b. At a later instant the voltage of winding 20b will have become the highest of the secondary voltages and a current will flow in winding 20b, anode 9b, lines 11 and 12, then winding 21b. Currents will be induced in windings 22b and 22m which currents will also circulate in windings 19a and 19c. By a process similar to that explained above the voltages between anodes 9a, 9b, 9c and line 12 become equal and the three anodes enumerated operate simultaneously. The above process is repeated in a similar fashion in each phase of the winding 20 with the result outlined in the description of the embodiment of Figure 1.

Figure 3:
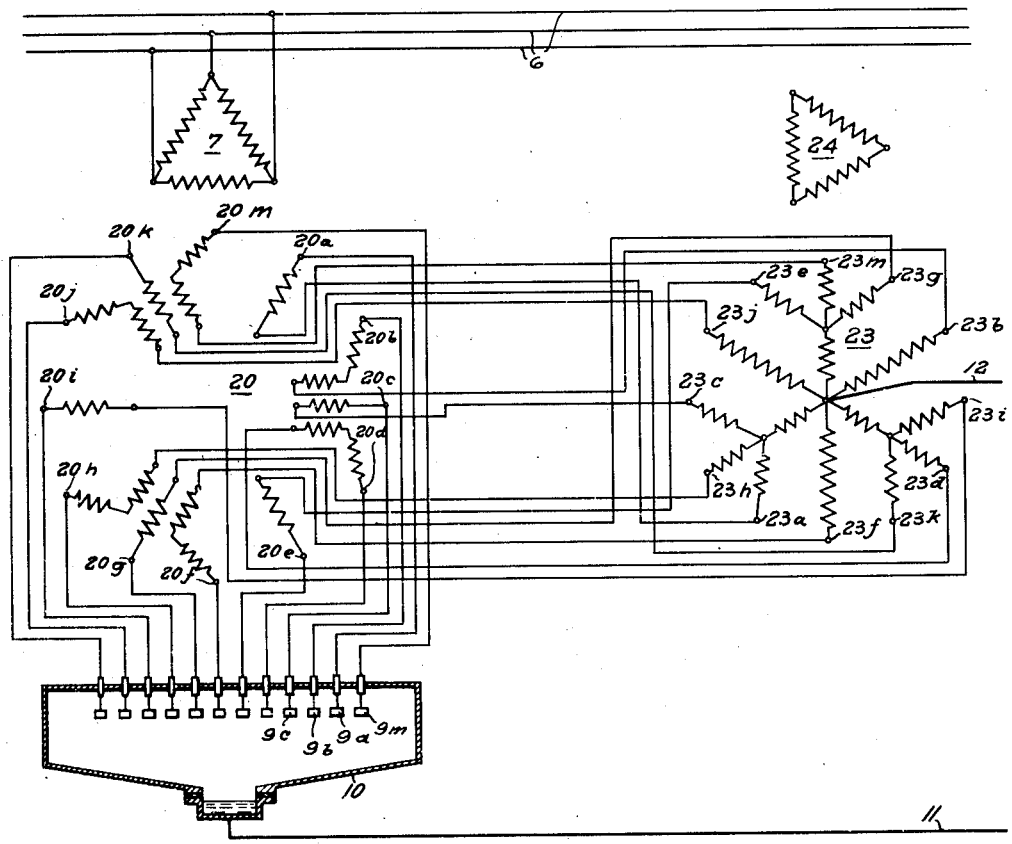
Fig. 3 illustrates a 12-phase rectifying system in which the anode circuits are interlinked by means of a single polyphase balancing transformer located between the supply transformer secondary windings and the output circuit.

In the embodiment shown in Fig. 3 the transformer secondary winding 20 is connected with the direct current output circuit through a balancing transformer 23 having a neutral point connected with conductor 12. Transformer 23 may be provided with a delta winding 24 for the purpose of reducing the magnetic leakages in the different portions of winding 23.

In operation, assuming that winding 7 is energized from line 6, winding 20 will receive twelve-phase alternating current voltages of which the voltage in winding 20a may be assumed as being the highest at the instant considered. A current will then flow from winding 20a to anode 9a, in lines 11 and 12, and winding 23a. Flow of current in winding 23a will tend to magnetize the core of transformer 23 in such a manner as to oppose the potential of winding 20a and as to add to the potentials of windings 20m and 20b to the end that the voltages impressed between anodes 9a, 9m and 9b, and the output conductor 12 may become equal, thereby forcing simultaneous operation of anodes 9a, 9m, 9b. At a later instant the voltage of winding 20b will have become the highest of the secondary voltages and a current will flow in winding 20b, anode 9b, in lines 11 and 12, and winding 23b. By a process similar to that explained above the voltages between anodes 9b, 9a, and 9c, and line 12 become equal and the three anodes operate simultaneously. The process is repeated in a similar fashion for each phase as the successive phases of the winding 20 reach their highest potential. The results obtained are identical with those obtained with the embodiments of Figure 1 and Fig. 2.

Figure 4:
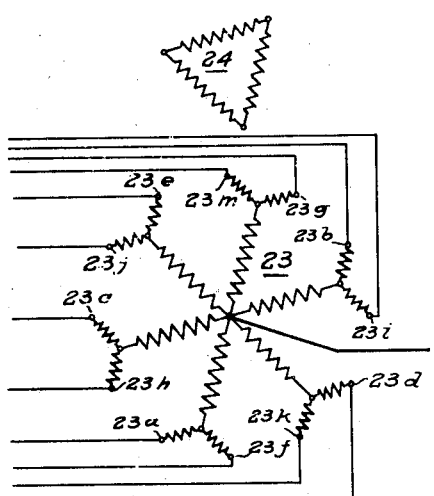
Fig. 4 illustrates a modification of the balancing transformer shown in the embodiment of Fig. 3.

In the embodiment of Fig. 3, transformer winding 23 is represented as a twelve-phase winding in which some of the phases are constituted by one winding and other phases by two windings associated with different legs of the transformer core. In the embodiment shown in Fig. 4 each phase of winding 23 is constituted by two windings so that the connections are entirely symmetrical. A secondary winding 24 is also provided for the purpose outlined above.

Figure 5:
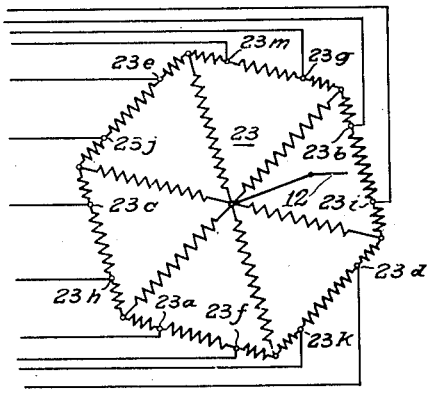
Fig. 5 illustrates a further modification of the balancing transformer shown in the embodiment of Fig. 3.

In the embodiment of Fig. 5 transformer 23 is shown as a polygon winding provided with a neutral point by means of a supplementary star winding. In this embodiment the winding itself provides a number of delta connections permitting circulation of equalizing currents and thereby renders the use of a separate delta winding 24 unnecessary.

Although we have elected to illustrate and describe a few embodiments of the present invention as controlling the operation of rectifiers of the metallic vapor arcing type, it will be apparent to those skilled in the art that it is equally applicable to the control of rectifiers of types such as the "Audion", "Thyratron", "Kuprox", etc. and that various changes and modifications may be made therein without departing from the spirit of the invention or from the scope of the appended claims.

It is claimed and desired to secure by Letters Patent:

1. In combination with an alternating current supply circuit, an output circuit, electric current rectifying means comprising a plurality of anodes, and a transformer interconnecting said circuits comprising a winding divided into a plurality of phase displaced sections greater in number than twice the number of phases of said supply circuit severally connected with said anodes and arranged to form a plurality of symmetrical polyphase systems, of means for causing a simultaneous flow of current from said supply circuit to said output circuit by way of winding sections of each of said polyphase systems and the said anodes connected therewith, comprising balancing transformer means having phase displaced winding sections equal in number to the said phase displaced sections of the first said winding and each included in series connection with a different section thereof and including means interlinking winding sections of the respective said polyphase systems.

2. In combination with an alternating current supply circuit, an output circuit, electric current rectifying means comprising a plurality of anodes, and a transformer interconnecting said circuits comprising a winding divided into a plurality of phase displaced sections greater in number than twice the number of phases of said supply circuit severally connected with said anodes and arranged to form a plurality of symmetrical polyphase systems, of means for causing a simultaneous flow of current from said supply circuit to said output circuit by way of winding sections of each of said systems and the anodes connected therewith, comprising balancing transformer means having phase displaced winding sections equal in number to the phase sections of the first said winding and each included in series connection with a different section thereof and including means inductively linked with the second said winding sections whereby potentials of the phase sections forming one of said polyphase systems are induced in the phase sections forming another of said polyphase systems.

3. In combination with an alternating current supply circuit, an output circuit, electric current rectifying means comprising a plurality of anodes, and a transformer interconnecting said circuits comprising a winding divided into a plurality of phase displaced sections greater in number than twice the number of phases of said supply circuit severally connected with said anodes and arranged to form a plurality of symmetrical polyphase systems, of means for causing a simultaneous flow of current from said supply circuit to said output circuit by way of winding sections of each of said polyphase systems and the anodes connected therewith, comprising balancing transformer means having phase displaced winding sections severally included in series connection with said phase displaced sections of the first said winding and a plurality of conductively connected winding sections inductively associated with the second said winding sections whereby potentials of the said phase sections forming one of said polyphase systems are induced in the said phase sections forming another of said polyphase systems.

4. In combination with an alternating current supply circuit, electric current rectifying means comprising a plurality of anodes, and means interconnecting said supply circuit with said output circuit by way of said rectifying means comprising a transformer having a winding divided into a plurality of phase displaced sections greater in number than twice the number of phases of said supply circuit severally connected with said anodes and arranged to form a plurality of symmetrical polyphase systems, of means for causing a simultaneous flow of current from said supply circuit to said output circuit by way of winding sections of each of said polyphase systems and the said anodes connected therewith, comprising balancing transformer means having a group of phase displaced winding sections severally included in series connection with the phase displaced sections of the first said winding forming one of said polyphase systems and another group of phase displaced winding sections formed of portions connected in zigzag severally included in series connection with the phase displaced sections of the first said winding forming another of said polyphase systems, and conductively connected winding sections inductively coupling the winding sections of the first said group with the winding sections of the said another group whereby the potentials of the phase sections forming one of said groups are induced in the phase sections forming the said another group.

5. In combination with an alternating current supply circuit, an output circuit, electric current rectifying means comprising a plurality of anodes, and means interconnecting said supply circuit with said output circuit by way of said rectifying means comprising a plurality of phase displaced transformer winding sections greater in number than twice the number of phases of said supply circuit severally connected with said anodes and arranged to form a plurality of symmetrical polyphase systems, of means for causing a simultaneous flow of current from said supply circuit to said output circuit by way of winding sections of each of said polyphase systems and the anodes connected therewith, comprising balancing transformer means having a group of phase displaced winding sections severally included in series connection with the phase displaced sections of the first said winding forming one of said polyphase systems and another group of phase displaced winding sections severally included in series connection with the phase displaced sections of the first said winding forming another of said polyphase systems, the respective phase displaced sections of the first said winding forming one of said polyphase systems and the respective phase displaced winding sections of the group thereof included in series connection therewith being formed of a plurality of portions connected in zigzag, and conductively connected winding sections inductively coupling the winding sections of the first said group with the winding sections of the said another group whereby the potentials of the phase sections forming one of said groups are induced in the said phase sections forming the said another group.

6. In combination with an alternating current supply circuit, an output circuit, a transformer having a primary winding connected with said supply circuit and a secondary winding divided into a plurality of star connected phase displaced sections greater in number than twice the number of phases of said supply circuit connected with said output circuit and arranged to form a plurality of symmetrical polyphase systems, and electric current rectifying means comprising a plurality of anodes equal in number to and severally connected with said phase displaced sections, of means for causing a simultaneous flow of current from said supply circuit to said ouput circuit by way of winding sections of the respective said polyphase systems and the anodes connected therewith, comprising a balancing transformer having a winding divided into a plurality of phase displaced sections severally included in the connections between the said anodes and phase sections forming one of said polyphase systems, a second balancing transformer having a winding divided into a plurality of phase displaced sections severally included in the connections between the said anodes and the said phase displaced sections forming another of said polyphase systems, and conductively connected winding sections inductively coupling the said winding sections of the respective said balancing transformers to thereby equalize the said flow of current through winding sections of the respective said polyphase systems and the anodes connected therewith.

7. In combination with an alternating current supply circuit, an output circuit, a transformer having a primary winding connected with said supply circuit and a secondary winding divided into a plurality of star connected phase displaced sections greater in number than twice the number of phases of said supply circuit connected with said output circuit and arranged to form a plurality of symmetrical polyphase systems, and electric current rectifying means comprising a plurality of anodes equal in number to and severally connected with said phase displaced sections, of means for causing a simultaneous flow of current from said supply circuit to said output circuit by way of winding sections of the respective said polyphase systems and the anodes connected therewith, comprising a balancing transformer having a winding divided into a plurality of phase displaced sections severally included in the connections between the said phase displaced sections forming one of said polyphase systems and the anodes connected therewith, a second balancing transformer having a winding divided into a plurality of phase displaced sections severally included in the connection between the said phase displaced sections forming another of said polyphase systems and the anodes connected therewith, each of the said phase displaced sections forming one of said polyphase systems and each of the phase displaced sections of the said winding of the balancing transformer connected therewith being divided into a plurality of zigzag connected portions, and conductively connected winding sections coupling the said winding sections of the respective said balancing transformers to thereby substantially equalize the said flow of current through winding sections of the respective said polyphase systems and the said anodes connected therewith.

8. In combination with an alternating current supply circuit, an output circuit, electric current rectifying means comprising a plurality of anodes, and a transformer having a primary winding connected with said supply circuit and a secondary winding divided into a plurality of phase displaced sections greater in number than twice the number of phases of said supply circuit severally connected with said anodes and arranged to form a plurality of symmetrical polyphase systems, of means for causing a simultaneous flow of current from said supply circuit to said output circuit by way of phase displaced sections of the respective said polyphase systems and the anodes connected therewith, comprising a balancing transformer having a winding divided into a plurality of phase displaced sections severally connected with the said phase displaced sections forming one of said polyphase systems and being connected to form a neutral point connected with said output circuit, a second balancing transformer having a winding divided into a plurality of phase displaced sections severally connected with the said phase displaced sections forming another of said polyphase systems and being connected to form a neutral point connected with said output circuit, and conductively connected winding sections inductively coupling the said phase displaced sections of the said windings of the respective said balancing transformers whereby the potentials of the phase sections connected with the said phase sections forming one of said polyphase systems are induced in the said phase displaced sections forming the said another of said polyphase systems to thereby substantially equalize the said flow of current through winding sections of the respective said polyphase systems and the said anodes connected therewith.

9. In combination with an alternating current supply circuit, an output circuit, electric current rectifying means comprising a plurality of anodes, and a transformer having a primary winding connected with said supply circuit and a secondary winding divided into a plurality of phase displaced sections greater in number than twice the number of phases of said supply circuit severally connected with said anodes and arranged to form a plurality of symmetrical polyphase systems, of means for causing a simultaneous flow of current from said supply circuit to said output circuit by way of phase displaced sections of the respective said polyphase systems and the anodes connected therewith, comprising a balancing transformer having a winding divided into a plurality of phase displaced sections severally connected with said phase displaced sections forming one of said polyphase systems and being arranged to form a neutral point connected with said output circuit, a second balancing transformer having a winding divided into a plurality of phase displaced sections severally connected with the phase displaced sections forming another of said polyphase systems and being arranged to form a neutral point connected with said output circuit, the respective phase displaced sections forming one of said polyphase systems and the respective phase displaced sections of the balancing transformer connected therewith being formed of portions connected in zigzag, and conductively connected windings inductively coupling the said phase displaced sections of one of said balancing transformers with the said phase displaced sections of the other of said balancing transformers to thereby substantially equalize the said flow of current through winding sections of the respective said polyphase systems and the anodes connected therewith.

10. In combination with an alternating current supply circuit, an output circuit, electric current rectifying means comprising a plurality of anodes, and a transformer having a primary winding connected with said supply circuit and a secondary winding divided into a plurality of phase displaced sections greater in number than twice the number of phases of said supply circuit severally connected with said anodes, of means for causing a simultaneous flow of current from said supply circuit to said output circuit by way of at least three of said phase displaced sections and the anodes connected therewith, comprising a balancing transformer having a winding divided into a plurality of phase displaced sections severally included in series connection with the respective first said phase displaced sections and arranged to form a neutral point connection with said output circuit, the phase displacement of certain of the said phase displaced sections of the said secondary winding and the phase displaced sections of the said balancing transformer being obtained by forming such sections of a plurality of zigzag connected portions.

11. In combination with an alternating current supply circuit, an output circuit, electric current rectifying means comprising a plurality of anodes, and a transformer interconnecting said circuits comprising a winding divided into a plurality of phase displaced sections greater in number than twice the number of phases of said supply circuit severally connected with said anodes, of means for causing a simultaneous flow of current from said supply circuit to said output circuit by way of at least three of said phase displaced sections and the anodes connected therewith, comprising a balancing transformer having a plurality of phase displaced sections severally included in series connection with the respective first said phase displaced sections and arranged to form a neutral point connection with said output circuit, the phase displacement of certain of said phase sections of the respective said windings being obtained by forming such sections of a plurality of zigzag connected portions whereby the duration of said flow of current through the respective said phase displaced sections and the anodes connected therewith is extended and substantially equalized.

12. In combination with an alternating current supply circuit, an output circuit, electric current rectifying means comprising a plurality of anodes, and a transformer interconnecting said circuits comprising a winding divided into a plurality of phase displaced sections greater in number than twice the number of phases of said supply circuit severally connected with said anodes, of means for causing a simultaneous flow of current from said supply circuit to said output circuit by way of at least three of said phase displaced sections and the anodes connected therewith, comprising a balancing transformer having a plurality of phase displaced sections severally included in series connection with the respective first said phase displaced sections and arranged to form a neutral point connection with said output circuit, the phase displacement of the respective phase displaced sections of said balancing transformer being obtained by forming such sections of a plurality of zigzag connected portions whereby the duration of said flow of current through the respective said phase displaced sections and the anodes connected therewith is extended and substantially equalized.

13. In combination with an alternating current supply circuit, an output circuit, electric current rectifying means comprising a plurality of anodes, and a transformer interconnecting said circuits comprising a winding divided into a plurality of phase displaced sections greater in number than twice the number of phases of said supply circuit severally connected with said anodes, of means for causing a simultaneous flow of current from said supply circuit to said output circuit by way of at least three of said phase displaced sections and the anodes connected therewith, comprising a balancing transformer having a winding divided into a plurality of phase displaced sections severally included in series connection with the respective first said phase displaced sections and arranged to form a neutral point connection with said output circuit, the phase displacement of the respective phase displaced sections of the said balancing transformer being obtained by forming such sections of a plurality of zigzag connected portions whereby the duration of said flow of current through the respective said phase displaced sections and the anodes connected therewith is extended and substantially equalized, and a second winding for said balancing transformer for reducing the flux leakages of the respective phase displaced sections of the first said winding thereof.

14. In combination with an alternating current supply circuit, an output circuit, electric current rectifying means comprising a plurality of anodes, and a transformer interconnecting said circuits comprising a winding divided into a plurality of phase displaced sections greater in number than twice the number of phases of said supply circuit severally connected with said anodes, of means for causing a simultaneous flow of current from said supply circuit to said output circuit by way of at least three of said phase displaced sections and the anodes connected therewith, comprising a balancing transformer having a winding divided into a plurality of phase displaced sections severally included in series connection with the first said phase displaced sections and arranged to form a neutral point connection with said output circuit, the said phase displaced sections of the last winding being arranged in pairs having a portion common to the respective sections forming each pair, and a second winding for said balancing transformer coupled with the said phase displaced sections thereof for reducing the flux leakages of the respective phase displaced sections of the first said winding thereof.

15. In combination with an alternating current supply circuit, an output circuit, electric current rectifying means comprising a plurality of anodes, and a transformer interconnecting said circuits comprising a winding divided into a plurality of phase displaced sections greater in number than twice the number of phases of said supply circuit severally connected with said anodes, of means for causing a simultaneous flow of current from said supply circuit to said output circuit by way of at least three of said phase displaced sections and the anodes connected therewith, comprising a balancing transformer having a winding divided into a plurality of phase displaced sections severally included in series connection with the first said phase displaced sections and winding sections joining adjacent ones of the last said phase displaced sections to form a star-polygon connected system having the star point thereof connected with said output circuit whereby the dissimilarities in the inductances of the first said winding are substantially neutralized.

HEINRICH MEYER-DELIUS.
ERWIN KERN.